United States Patent

[11] 3,588,628

| [72] | Inventor | David B. Peck |
| | | Williamstown, Mass. |
| [21] | Appl. No. | 822,584 |
| [22] | Filed | May 7, 1969 |
| [45] | Patented | June 28, 1971 |
| [73] | Assignee | Sprague Electric Company |
| | | North Adams, Mass. |

[54] ENCAPSULATED ELECTRICAL COMPONENT WITH PLANAR TERMINALS
6 Claims, 4 Drawing Figs.

[52] U.S. Cl. .................................................... 317/230, 317/242
[51] Int. Cl. .................................................... H01g 9/05, H01g 1/01
[50] Field of Search ....................................... 317/230, 101

[56] References Cited
UNITED STATES PATENTS

| 2,898,520 | 8/1959 | Sterner | 317/101 |
| 3,215,794 | 11/1965 | Zielinski | 317/101X |
| 3,323,023 | 5/1967 | Walker | 317/101 |
| 3,341,752 | 9/1967 | Fournier | 317/230 |
| 3,464,051 | 8/1969 | Webb | 317/101 |

Primary Examiner—James D. Kallam
Attorneys—Connolly and Hutz, Vincent H. Sweeney, James Paul O'Sullivan and David R. Thornton ABSTRACT: A packaged electrical component has strain sensitive elements mounted on strain absorbing portions of terminals that are located in an encapsulation which maintains the terminal elements of the component in a common plane at a surface of the encapsulation.

PATENTED JUN28 1971 3,588,628

ENCAPSULATED ELECTRICAL COMPONENT WITH PLANAR TERMINALS

BACKGROUND OF THE INVENTION

This invention relates to planar terminated electrical components, and more particularly to encapsulated capacitors, especially solid electrolyte capacitors, having planar external terminal connections.

For direct mounting of electrical components to substrates such as ceramic thick film electroded circuits or etched copper plastic-based circuits, it is necessary that the terminal elements of the component be in a planar configuration. Connections can be made through the substrate by reflow soldering, brazing, welding or other means. As indicated, it is essential for the planar terminals to share the same plane at all times, even during the assembly of the component to the terminals.

Many electrical components, such as solid electrolyte tantalum capacitors, have active elements which are particularly "strain sensitive," i.e., the electrical performance of the element will deteriorate if the sensitive portion is subjected to bending, torsion, or other mechanical movement. After formation of the active capacitor system of a solid electrolyte tantalum capacitor the anode terminal wire, if subjected to mechanical strain, can give rise to high leakage currents and even short circuits, due to the rupture of the dielectric film in an area where contact may be made with the semiconductor cathode.

It is an object of this invention to overcome the foregoing and related disadvantages. A still further object is to produce an encapsulated planar-terminated capacitor.

SUMMARY OF THE INVENTION

Broadly, this invention concerns insulated electrical components having improved terminal connection areas and, more particularly, to an encapsulated solid electrolyte capacitor having external terminal connections in the same plane.

In a preferred embodiment, a capacitor element is physically and electrically connected to strain absorbing terminal members with the planar terminal electrodes maintained in a fixed spatial configuration with respect to each other. The capacitor assembly is completed by encapsulating the entire unit except for a portion of both of the terminal electrodes which are left exposed for further interconnection. The strain absorbing members insure that the capacitor element is exposed to a minimum amount of stress during the encapsulation and subsequent handling; the availability of electrode terminal connections in the same plane simplifies further operations such as attachment to a printed circuit board.

DETAILED DESCRIPTION OF THE INVENTION

Figure 1:
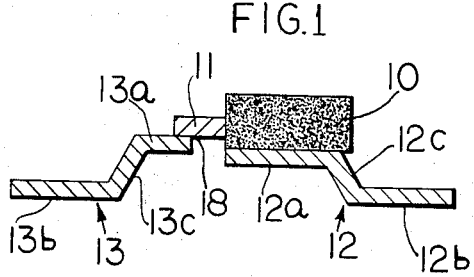
FIG. 1 shows a cross-sectional view of an electrical capacitor formed according to the invention.
Figure 2:
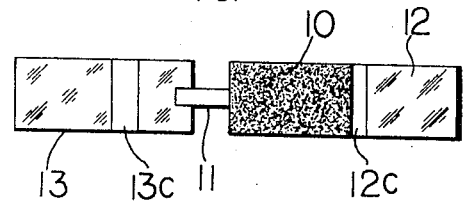
FIG. 2 shows a top view of the capacitor of FIG. 1.

Referring to FIGS. 1 and 2, capacitor section 10 is an anodized tantalum pellet with a tantalum anode wire 11 welded thereto or buried therein. After anodization, the section 10 is impregnated with a semiconductor electrolyte such as lead dioxide or manganese dioxide, followed by application of a conducting cathodic surface. Such a unit section is described in detail in U.S. Letters Pat. No. 2,936,514 issued to R. J. Millard on May 17, 1960.

The section 10 is seated on planar terminal member 12 while wire 11 is attached to planar terminal member 13. The actual termination of the active component section to the terminal electrodes is accomplished at portions 12a and 13a by soldering, welding or other established interconnection technique. Terminal portions 12b and 13b of members 12 and 13 lie in the same plane and serve to further connect the capacitor section electrodes. Strain absorbing sections 12c and 13c are mechanically designed and selected from appropriate material so as to protect the wire 11 and, in some cases, section 10 from deformation or strain during the manufacturing process and later encapsulation. More specifically, section 13c acts as a resilient spring which absorbs shock and strain which might otherwise be transmitted to wire 11.

The mechanical geometry selected to provide the strain absorbing material can be one of several. The cantilever arrangement shown at portions 12c and 13c is particularly desirable. For it to be effective, however, the ductility of the metal, or more particularly the mechanical strength of the metal in the vertical plane should be significantly less than that of the strain sensitive layer to which it is bonded. In the case of a tantalum terminal element for a pellet capacitor, nickel is of sufficient softness (providing appropriate thickness relationship is maintained). Additional details will be given in a later example.

Figure 3:
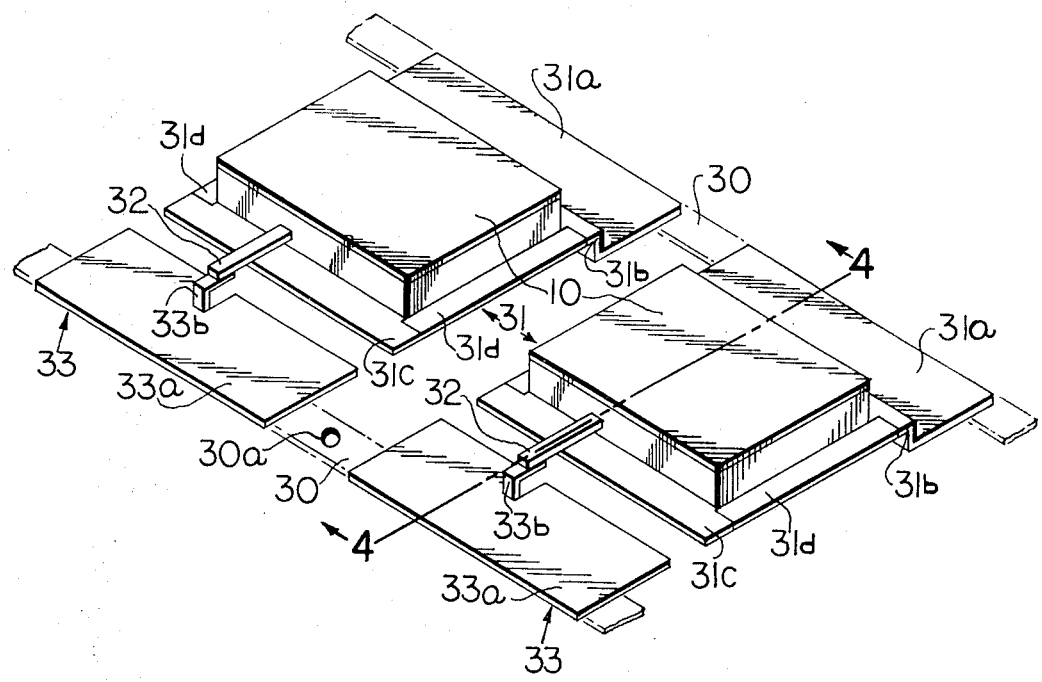
FIG. 3 portrays the layout of two typical capacitor assemblies during assembly.
Figure 4:
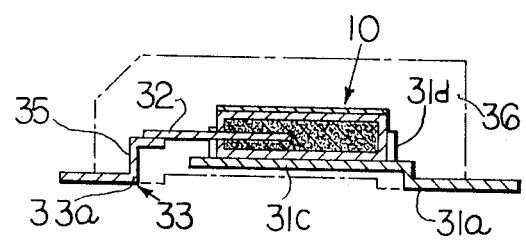
FIG. 4 shows a cross-sectional view of one of the units of FIG. 3 after encapsulation.

FIG. 3 shows two capacitor assemblies on a typical assembly frame 30. The frame provides structural support and accurate alignment during capacitor attachment and encapsulation and can be later severed from the completed assembly. Alignment holes 30A are included for accurate alignment of the frame throughout the assembly process. FIG. 4 shows a cross-sectional view of one of the capacitor assemblies of FIG. 3 taken along line 4—4.

Referring to FIGS. 3 and 4, each section is seated on planar terminal member 31 while anode termination 32 is welded to planar terminal member 33. Terminal member 31 comprises terminal portion 31a lying in the same plane as terminal portion 33a; strain absorbing section 31b, connection shelf 31c and a section 31d which folds up to accurately center the section and position it for subsequent encapsulation procedure.

Encapsulant 36 represents a molded or poured resin casing about the capacitor.

Anode termination 32 is welded to cantilever strain-absorbing section 33b and essentially "floats" on the softer member. This section is usually punched out of member 33 while member 33 itself as well as member 31 are usually punched from a single strip of material. This facilitates multiassembly and encapsulation.

The table lists the comparative results obtained by subjecting a standard type of planar terminal component assembly which is not subject to the advantages of the invention of the embodiments of FIGS. 1—3. The standard assembly also has planar anode and cathode terminals which may be punched or formed from a single piece of strip metal, using bridges to maintain the necessary exact alignment between the anode and cathode terminal portions. An electrical element is soldered to the cathode planar terminal. The capacitor may be molded or encapsulated in epoxy resin in the same manner applicable to the components of the present invention, excepting of course that no strain absorbing or relieving elements are present. The characteristics of the two assemblies differ sharply as noted in the examples which follow.

A series of capacitors were made up in the construction shown in the present invention (FIGS. 1, 2 and 3) using as a control, similar capacitors made by the process and to the construction described above. The simple table which follows described the results of the experiment indicating that the devices of the invention are not subject to the strain defects of the prior art construction as evidenced by the lower leakage currents.

EXPERIMENTAL SOLID ELECTROLYTE TANTALUM CAPACITORS

| Construction | Anode protection | Average leakage current in microamperes | | |
|---|---|---|---|---|
| | | Initial | After assembly to terminals * | After molding ** |
| Standard | None | 0.8 | 2.9 | 3.6 |
| Invention | do | 0.8 | 0.9 | 0.9 |

*soldering of cathode to negative terminal, welding anode wire to positive terminal

**molding for 3 minutes at 140°C in Hysol MG-4 epoxy resin.

It is evident that the invention is applicable to all types of strain sensitive components, including diodes, piezoelectric and ferroelectric ceramic capacitors and similar devices, film capacitors made with very thin electrode foils and the like.

According to the preferred embodiment of the invention, the electrical component is a solid electrolyte capacitor and the strain relieving mounting assembly is employed at both anode and cathode end, although good results can be obtained if only the anode protection is employed.

The planar terminal electrode material is preferably nickel or alloys predominating therein. The thickness and hardness of the planar terminal material must take into account the dimensions and strength of the strain sensitive element in order to absorb and react to substantially all strains on a preferential basis. Other metals which can be employed are Kovar, beryllium, copper and phosphor bronze.

The capacitor may be encapsulated by injection, transfer or compression molding, during the process of which the strain absorbing elements are beneficial, as well as in the earlier processing steps.

It is to be understood that components with more than two terminals may employ the herein described construction with good results. For example, beam-leaded transistors and integrated circuits can be produced. It is to be understood that the invention is generally limited to constructions wherein the planar terminals are maintained in the terminating portions in an essentially rigid spatial relationship.

I claim:

1. An encapsulated electrical component comprising a strain sensitive element, planar terminals maintained in a fixed spatial configuration with each other, electrodes of said element electrically connected to said terminals, at least one of said terminals having a strain absorbing portion, said element being electrically and physically connected to said portion, said element and said terminals being encapsulated with said terminals each having an exposed surface in a common plane at a common surface of the encapsulation.

2. The component of claim 1 wherein said element is a capacitor, and said terminals are metal strip material.

3. The electrical capacitor of claim 2 wherein said capacitor element is a solid electrolyte capacitor element and said strain absorbing portion is a cantilevered section of said metal strip material.

4. The capacitor of claim 3 wherein two strain absorbing cantilevered portions are employed in connection to spaced electrodes of said capacitor.

5. The capacitor of claim 4 wherein the planar terminals comprise nickel and one of said electrodes of said capacitor is a tantalum wire.

6. The capacitor of claim 4 wherein said portions fold upwardly from said common surface so as to partially center said capacitor in said encapsulation.